United States Patent [19]
Lundsager

[11] 3,963,504
[45] June 15, 1976

[54] POROUS CERAMIC STRUCTURE

[75] Inventor: Christian Bent Lundsager, Ashton, Md.

[73] Assignee: W. R. Grace & Co., New York, N.Y.

[22] Filed: Dec. 24, 1974

[21] Appl. No.: 536,079

Related U.S. Application Data

[63] Continuation-in-part of Ser. No. 269,204, July 5, 1972, abandoned, which is a continuation-in-part of Ser. No. 83,020, Oct. 22, 1970, abandoned.

[52] U.S. Cl. ................................. 106/41; 264/43; 264/44; 264/59; 264/63; 252/477 R
[51] Int. Cl.² ................... C04B 21/04; B01J 35/00; C04B 21/06; C04B 35/00
[58] Field of Search ............... 106/41; 264/43, 44; 264/59, 63; 252/477 R, 455, 430

[56] References Cited
UNITED STATES PATENTS

| | | | |
|---|---|---|---|
| 2,593,507 | 4/1952 | Wainer | 264/44 |
| 2,939,199 | 6/1960 | Strivens | 264/63 |
| 3,125,618 | 3/1964 | Levinson | 264/63 |
| 3,285,873 | 11/1966 | Bailey | 264/44 |
| 3,320,044 | 5/1967 | Cole et al. | 264/63 |
| 3,467,602 | 9/1969 | Koester | 252/465 |
| 3,533,753 | 10/1970 | Berger | 264/49 |
| 3,755,204 | 8/1973 | Sergeys | 252/455 R |

*Primary Examiner*—Winston A. Douglas
*Assistant Examiner*—Mark Bell
*Attorney, Agent, or Firm*—Joseph P. Nigon

[57] ABSTRACT

A porous ceramic monolithic structure prepared by shaping a ceramic filled polyolefinic material containing a plasticizer, shaping, extracting the plasticizer and treating to remove the polyolefin. The monolithic structure is characterized by uniform pore openings. It has uniform channels of an essentially rectangular cross section, laterally through the length of the monolith, varying in size from 0.025 to 0.20 inches.

3 Claims, 2 Drawing Figures

POROUS CERAMIC STRUCTURE

REFERENCE TO RELATED APPLICATIONS

This case is a continuation in part of application Ser. No. 269,204, filed July 5, 1972, and now abandoned, which is in turn, a continuation in part of application Ser. No. 83,020, filed Oct. 22, 1970, now abandoned.

Reference is also made to co-pending application Ser. No. 82,198, filed Oct. 22, 1970, now U.S. Pat. No. 3,755,204, inventor Francis J. Sergeys, of common ownership herewith, directed to the use of the aforesaid ceramic article in making auto exhaust catalyst.

It is commonly known to use organic material as binders when fabricating ceramic bodies. The purposes are to give strength to the green bodies after the water, which commonly is used to make the ceramic workable, has been dried off prior to firing. We have found a new system for an organic binder, which gives us a material which can be processed and shaped as a thermoplastic, with all the advantages of this versatile shaping technology. This material consisting of ceramic powder, high molecular weight polyolefin and a plasticizer handles like a thermoplastic, can be shaped and heatsealed, and yet, after the plasticizer has been extracted, the resulting green body, now a microporous body of ceramic and polyolefin, can be heated to temperatures where the polyolefin is removed by decomposition, distillation and combustion, without any distortion of the shape of the body.

A process for preparing a similar composition is described in Australian Patent No. 277,981 and Great Britain Patent No. 1,044,502. The latter patent discloses a method of producing a composition containing (i) a polyolefin of molecular weight sufficiently high to give it a standard load melt index of substantially zero (ii) an inert filler, e.g. ceramic powder, and (iii) a plasticizer. The composition described therein comprises 10–80% volume polyolefin, 5–60% by volume filler material, and 15–85% by volume plasticizer.

Attempts to form ceramic structures have also met with little success because in the early stages of firing the structures became distorted or even cracked. Attempts to overcome this difficulty have met with little success.

Porous ceramic structures are used for catalyst supports, absorption drying, separation of liquid phases, etc. Generally, porous ceramics are prepared by one of two methods: The first method consists of firing an alumina silicate with a small amount of flux to form a slight glassy bond. In the other method, alumina grain is fired with a ceramic material which melts and holds the grain together. Although both of these methods produce excellent porous ceramics, both are time consuming and production is slow.

Attempts to prepare porous ceramic articles have met with failure in that there has been an absence of success in preparing a sturdy porous ceramic article from a ceramic powder filled, plasticized thermoplastic.

The monolith of this invention is prepared by the steps of (i) preparing a composition comprising a ceramic filler, a plasticizer, and a polyolefin material, (ii) shaping the material, (iii) extracting the plasticizer, (iv) burning the shaped material to remove the polyolefin, and (v) firing the ceramic material which remains.

SUMMARY OF THE INVENTION

Figure 1:
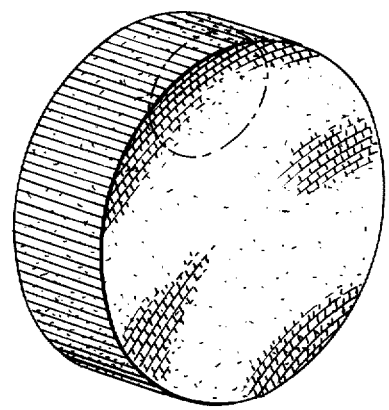
FIG. 1 shows the finished product of this invention (only the sintered ceramic material remains).

This invention is a novel ceramic monolith. The method of preparing these structures includes shaping a filled polyolefin material containing a plasticizer, extracting the plasticizer, burning-off the polyolefin, and firing the porous shaped ceramic monolith. One of the characteristics of the porous ceramic monolith is the uniform passages through the monolith which increase the effectiveness of contacting a gas or liquid with a ctatalyst supported on the structure.

Each of the steps in preparation of the monolith are important. The extraction step is particularly important. I have found that when the plasticizer is extracted from a ceramic powder filled, plasticized polyolefin the high viscosity of the remaining high molecular weight polyolefin prevents flow of the polyolefin during heating. In addition, the porosity which results from extraction of the plasticizer facilitates the departure of gaseous decomposition products from the degrading polyolefin. When properly combusted, the combustion products from the polyolefins are essentially harmless carbon dioxide and water.

DETAILED DESCRIPTION OF THE INVENTION

The porous ceramic structure can be easily prepared from a starting material comprising a ceramic powder, a polyolefin, and a plasticizer.

It is to be understood that the references made to polyolefin are generally to high molecular weight linear polyethylene.

More specifically, we have found that a polyolefin of very high molecular weight (e.g. at least 150,000) is a good binder for ceramic powder and can tolerate high filler loadings without becoming brittle when a plasticizer is present. This is quite unlike conventional thermoplastics, e.g. polyethylene having a molecular weight of around 60,000 to 100,000 which yields brittle products at relativly low filler concentrations. Plasticizers must be incorporated into these highly filled blends to provide good flow characteristics and to facilitate mixing without causing excessive loss of flexibility, tough, flexible compositions therefore, can be produced from a threee component system consisting of (1) a high molecular weight polyolefin; (2) a filler; and (3) a plasticizer.

Each of the above stated components is essential for attainment of desirable performance of the binder system. The components of the composition can vary in the following amounts and still provide a workable plastic composition: polyolefin 5–67% by volume, plasticizer 15–80% by volume, and filler 15–80% by volume or polyolefin 5–70% by weight, plasticizer 10–70% by weight and filler 20–85% by weight. However, preferable ranges are polyolefin 5–50% by volume plasticizer 20–60% by volume, and filler 20–50% by volume.

The high molecular weight polymer confers strength and flexibility to the initial composition. The plasticizer, of course, also provides flexibility, but its primary role is to facilitate the initial dispersion of filler into the matrix; to increase the melt index, and thus, produce a processable compound; and to provide porosity for the combustion step.

A wide variety of inexpensive, finely divided ceramic materials is available for use as fillers. The following types are included as examples but are not limiting in this category: (a) metal oxides and hydroxides, especially those of silicon and aluminum such as α-alumina, (b) metal silicates and aluminates; naturally occurring clays, mica, etc.; precipitated silicates, synthetic zeolites, etc., (c) titanates, zirconates, and composition useful for making capacitors and piezoelectric devices, and (d) ferrite and garnet compositions useful in ferromagnetic devices.

More specifically, the fillers which are preferred include mullite ($3Al_2O_3.2SiO_2$), synthetic mullite compositions, zirconmullite, spinel, and cordierite ($2MgO.2Al_2O_3.5SiO_2$).

It has been found that fillers of very high surface area require more plasticizer to be processable in the plastic than fillers of less surface area and are very effective in retaining the oil, but generally give products with unmeasurably low melt indices. Additionally, ceramic powders of high surface area cannot be compounded to as high a filler loading capacity as those of a low surface area. Such fillers can be used in combination with fillers of low surface area to help retain the plasticizer.

In preparing the monolith of this invention, the terminology "plasticizer" is intended to define a material which performs five functions. First, the addition of the plasticizer will improve the processibility of the composition, i.e., lower the melt viscosity, or reduce the amount of power input which is required to compound and to fabricate the composition. As explained more fully hereinafter, the melt index is an indication of the processability of the composition, the melt index increasing as the molecular weight and viscosity decrease. The second function of the plasticizer is to improve the flexibility of the interim plastic composition. The improved flexibility is reflected in such measurements as the elongation at failure, the elongation at yield point, Spencer impact, and tension impact. The third function of the plasticizer is its utility in the production of the final porosity. Fourth, when the plasticizer is eventually removed the viscosity of the material is then increased. Fifth, removal of plasticizer gives porosity which facilitates escape of gaseous products which are produced when the polyolefin is heated and burned-off. The plasticizer is the component of the polyolefin/filler/plasticizer composition that is easiest to extract. The extraction can be performed with water or with any number of commercially available organic solvents, with the particular solvent depending upon the particular plasticizer used. It is especially advantageous, however, to use a plasticizer which is soluble in water. By using a water soluble plasticizer, the extraction process will be more economical due to the low cost and relative safety of water in comparison to that of organic solvents.

Examples of the numerous suitable plasticizers are the following:

a. clorinated hydrocarbons
b. miscellaneous plasticizers — sulfonamide, coumarone-indene, asphalt, etc.
c. hydrocarbons — paraffin oil, low polymers such as polyisobutylene and polybutadiene.

Examples of the numerous suitable water soluble plasticizers are:

a. glycol, glycol ethers and esters
b. glycerin, glycerol monoacetate, etc.
c. diethylene glycol, diethylene glycol ethers and esters, triethylene glycol, etc.
d. polyethylene glycols (molecular weight range 400 to 20,000)
e. propylene glycol, dipropylene glycol
f. polypropylene glycol (molecular weight range 260 to 1200)
g. trimethylene glycol, tetramethylene glycol, 2, 3-butylene glycol, etc.
h. alkyl phosphates (e.g., triethyl phosphate)
i. water soluble polymeric materials, such as polyvinyl-alcohols, partially hydrolyzed polyvinyl acetate, polyacrylic acid and polyvinyl pyrrolidone.

It is also possible to make the polyolefin product of this invention using various combinations of the above mentioned plasticizers, such as the usage of a water soluble and a water insoluble plasticizer with a suitable filler and high density polyethylene. Such combinations are intended to be within the scope of this invention.

The preferred method of preparing my novel monolith structure uses commercial particle form high molecular weight polyethylene, having a standard load (2160 g.) melt index of 0.0, a high load (21,600 g.) melt index of 1.8, a density of 0.95, and a viscosity of 4.0 measured as 0.02 grams of polymer in 100 g. decalin at 130°C. This polymer can be prepared by the method given in U.S. Pat. No. 2,825,721 using an ammonium fluoride treated chromium oxide catalyst. When the term "particle form" is used herein, it refers to the aforesaid polymer. However, any commercially available polyethylene having a standard load melt index of substantially 0 is entirely satisfactory. Many of the illustrations to be described used polyethylene having a standard load melt index of 0.00, a high load melt index of 0.01, and a viscosity of 9.3 measured as 0.02 grams of polymer in 100 g. decalin.

It is noteworthy that melt index is a measure of polyethylene flow at standard conditions of temperature, pressure, and time through an orifice of defined diameter and length as specified in ASTMD 1238-GST condition F ("Measuring Flow Rates of Thermoplastics by Extrusion Plastometer"). The rate of extrusion in g/10 minutes is the melt index, and it is used to indicate the average molecular weight of a polymer. The lower the molecular weight of a polymer, the more rapidly it extrudes, and therefore, melt index increases as molecular weight decreases. By "high-load melt index" (HLMI) is meant melt index determined by the procedure of ASTM-D-1238-65 Condition E, except that a weight of 21,600 g. is used.

However, I have found that in addition to high molecular weight particle-form high density (0.93–0.97) polyethylene, high molecular weight low density polyethylene, high molecular weight polypropylene, and high molecular weight particle form ethylene-butylene copolymer can also be used to give entirely satisfactory results.

The technique which was employed to produce the composition can be described as follows. In most cases the various components were premixed at room temperature in a "dough-mixer." However, in some cases the filler and plasticizer were slurried together at room temperature in a volatile solvent which was evaporated before the materials were combined with the polyethylene. The polyethylene/filler/plasticizer "dry blends " (in some cases a dough, in others a powder) were then mixed in a Brabender Plastograph.

The following mixing procedure was also found to be satisfactory. The polyolefin was added to the mixing chamber which was preheated to 180°C. When the polyolefin fluxed, the filler was added, followed by the plasticizer. In those areas where the initial portions of the filler produced extremely high torque, portions of the plasticizer were added to bring the torque down before the rest of the filler was added. Generally five minutes was allowed to melt the polymer and add the filler. It was found that when the filler is added as a dry powder it frequently accumulates in "dead spots" on the blades or in the mixing chamber. For this reason, a method of "double compounding" is used. This is accomplished by recovering all the material from the plastograph, and then replacing it in the plastograph to get the material from the "dead spots" adequately dispersed.

It is possible to produce the composition by mixing the components in any order. Generally the components are mixed in the plastograph at 30 to 200 RPM until the mix appears to be uniform.

The final product blends can vary in overall composition according to the desired porosity in the final product. It has been determined that the greater the overall surface area of the filler, the more plasticizer that can be incorporated. Further, the relative proportions of the ingredients can vary greatly, depending both upon the desired physical properties of the intermediate product and the final product.

The polyolefin/filler/plasticizer blends are normally pressed in standard fashion common to the art on a hydraulic press into 0.020 inch (nominal thickness) sheets at 125°–175°C. for about three minutes at about 500 psi. The intermediate has sufficient flexibility and strength to be subjected to the forming, fusing (where indicated), and extraction steps necessary before burning and firing. It is thus characterized by:

a. complete flexibility
b. the ability to be rolled upon itself
c. the ability to fuse at points of contact
d. sufficient strength to withstand distortion during the extraction and heating steps.

In perhaps the simplest embodiment of the invention, the polyolefin/plasticizer/filler composition is initially shaped in its final form. This is achieved by forming ridges on the flexible sheet. The sheet composition may be folded back on itself, or rolled up. To hold the shape through further processing, the structure is fused together at its points of self contact. This is readily done by a heating step, typically at about 150° to 250°C, preferably about 200°C. This may be accomplished by directing a hot gas at the surfaces of the sheet to be joined. This fuses the structure into a self-supported shape, and this shape is retained during the subsequent steps of plasticizer extraction, polyolefin burn-off, and final sintering.

Following fusion the plasticizer is then extracted. This can be accomplished by any solvent in which the plasticizer is soluble. For example, when using a plasticizer such as mineral oil, hexane is a suitable solvent. When a water soluble plasticizer such as diethylene glycol is used, water is a suitable solvent. The removal of the plasticizer results in the formation of a microporous structure. In addition to providing greater surface area, the extraction of the plasticizer prior to burning off the polyolefin is of great value since the formation of the micropores facilitates escape of the gaseous products which are formed when the polyolefin is burned off.

After the plasticizer has been extracted, the structure is heated to above the degradation temperature of the thermoplastic so as to completely burn off the polyolefin. The degradation temperature will, of course, vary with the choice of polyolefin. For the high viscosity linear polyethylene that I prefer to use, a temperature in the range of at least 240° to 260°C. is greatly preferred to initiate degradation.

At a temperature of about 240°C. (when polyethylene is the polyolefin) the structure begins to turn black and at about 700°C. the structure begins to turn white, (if the filler is alumina) indicating that the termoplastic has entirely burned off.

When the thermoplastic is completely burnt off, the temperature is increased to that at which the particular powder sinters into a monolithic structure, still retaining the microporosity. When using a preferred ceramic powder, α-alumina, a temperature of about 1300°–1450°C. is recommended. The temperature is held at the sintering point for about 2 hours and then the structure is allowed to cool slowly to room temperature. The cooling time is generally about 3–4 hours.

The resulting porous ceramic body appears identical in shape to the original plastic structure except that a slight linear shrinkage, 3–20%, takes place.

The combination of these characteristics is critical when the monolith is to be used as an auto exhaust catalyst support. The uniform channels assure that the catalytic agent is distrubuted uniformly on the monolith. In addition, this uniformity greatly decreases the possibility that some of the pores would become filled with catalytic material thus decreasing the area of catalyst exposed to the exhaust gases.

The surface roughness is critical in that it allows the monolith to be coated by depositing a ceramic slip on the monolith. The ceramic slip may contain the catalytic agents when these agents are noble metals, thus assuring uniform distribution on the monolith. The slip may be deposited in the monolith and then impregnated with the catalytic agents. This method may be used when the catalytic agents are copper, nickel, etc.

The porosity and pore size are important in that these characteristics limit the amount of catalyst deposited on the monolith and provide the sites for contact of the exhaust gases with the catalyst.

The monolith of my invention has the following physical characteristics:

Bulk density 34 – 36 pounds per cubic foot
Open face area 60 – 65 percent
Openings per square inch 200 – 1000
Geometric surface 50–52 square inches per cubic inch
Water adsorbtion
(at 20°C vacuum technique) 20 – 30 %
Web thickness 6 – 15 mils
Web separator thickness 3 14 16 mils
coefficient of thermal expansion 1.25 to 3.0 × 10$^{-6}$ per degree fahrenheit
Axial crush strength 2300 to 3000 psi.

The following examples will aid in further explaining the invention.

EXAMPLE 1

An alumina filled polyethylene composition designated Composition A and containing the following components, 8.6 grams particle form linear polyethylene of 0 Melt Index (SLMI), 76.8 grams α-alumina, and 28.8 grams of a mineral oil with approximately 80% saturates (viscosity: ssµ at 100°F = 547, refractive index = 1.4932 ± 0.0003, and specific gravity at 15°C. = 0.9036 – 0.9071) available commercially as Shellflex 411 was prepared by compounding the raw materials in a Brabender Plastograph at 170°C. This composition was then labeled "Plastic A" and was then pressed to a 12 mil sheet in a hydraulic press with 20 tons force, then repressed in a mold to give a ribbed sheet with a 6 mil backweb, and about 25 mil wide with a taper, 30 mil high ribs spaced ⅛ inch apart. From the ribbed sheet, strips were cut 30 mm. wide by 8 inches, and these were rolled up tightly with the ribs in the direction of the axis of the roll, forming a honeycomb-like cylinder. This was inserted into a tight fitting, glass tube, and heated to heatseal the consecutive layers of the spiral roll of ribbed sheet at about 150°C.

The cylinder was then cooled and immersed in hexane for 30 minutes to extract substantially all the mineral oil, then dried and heated in a furnace in an oxidizing atmosphere first to about 250°C. (over a period of about 2 hours) when degradation began as evidenced by the black color of the structure. The temperature was slowly increased and about 2 hours later and at about 700°C. the structure turned white, indicating that the burn off of the polyethylene was complete. The temperature was then slowly increased and about 2 hours later the temperature reached 1450°where it was held for about 2 hours to sinter the remaining ceramic powder and cooled slowly (about 4 hours).

The honeycombed porous ceramic body (designated "Ceramic body A") which resulted appeared identical in shape to the original plastic structure, but the dimensions were slightly smaller. The body had good physical strength and was hard enough to scratch ordinary glass.

In the generalized description, it will be noted that the invention is defined in volume percent. This mode of definition is frequently preferred, since the volumes of the respective components are more generally important than their respective weights as regards control processability of the polymer/filler/plasticizer mixture and ability of the product to sinter to a strong ceramic product and yet retain useful porosity.

A monolith prepared by this general technique had the following characteristics:

Bulk density 35.5 lbs. per cubic foot (0.57 g/c.c.)
Open face area 60–65%
Openings per square inch 260
Geometric surface 50 – 52 square inches per cubic inch
Water absorption 23–25%
Web Thickness 8 mils
Web separator thickness 16 mils
Coefficient of thermal expansion $1.25 \times 10^{-6}$ per °fahrenheit
Axial crush strength 2300 –3000 pounds per square inch.

EXAMPLE 2

Another sample of Composition A was used to prepare another sample of "Plastic A" which was then made into a foamable material (designated "Plastic Foam A") by the addition of 0.25% of a chemical blowing agent, azo-bis-formamide. The foamable material was heated at 200°C. at which temperature the foaming agent decomposes. The foamed material was then water-cooled and fused as in Example 1. The plasticizer, mineral oil, wax then extracted by dipping the shaped material into hexane for 30 minutes. After drying at room temperature for 30 minutes, the shaped material was heated in a furnace to about 250°C., then 700°C. and finally to 1450°C. as in Example 1 to burn off the polyethylene ;and to sinter the ceramic powder and cooled slowly. The porous ceramic body (designated "Ceramic Body C") which resulted appeared identical in shape to the original foamed structure except that the dimensions were slightly smaller. This ceramic body provided additional pore volume and was less dense than Ceramic Bodies A and B.

EXAMPLES 3 AND 4

Example 1 was repeated except that a high molecular weight ethylene-butene copolymer commercially available from Allied Chemical Company (O standard load melt index, 1.8 high load melt index, 0.943 density, a reduced solution viscosity of 4.0 and a molecular weight of about 180,000) was used in place of polyethylene in Example 3. In Example 4, Hifax 1901, a high density linear polyethylene (O standard load melt index, and a molecular weight of about 2 million) was used in place of the polyethylene. In each case, ceramic bodies were obtained exhibiting good strength.

Various other fillers as explained herein were used in place of the α-alumina of Example 1. Some of the particularly good ceramic powders adaptable to this invention were the following:

EXAMPLES 5–7

In Example 5 a mullite composition of 75% by weight raw kyanite (−325 mesh, $Al_2O_3 \cdot SiO_2$) and 25% by weight South Carolina kaolin (commercially available from Huber Corp.) was used in place of the α-alumina. In Examples 6 a mullite composition of 75% by weight calcined mullite (−325 mesh, a 70% alumina bauxite-clay calcine) and 25% by weight South Carolina kaolin (Huber Corp.) was used in place of the α-alumina; and in Example 7 a mullite composition of 85% calcined mullite (−325 mesh, a 70% alumina bauxite-clay calcine) and 15% Jackson ball clay (commercially available from Kentucky-Tenn. Clay Corp.) was used in place of the α-alumina. In each case the sintering temperature was about 1225°–1350°C. With each ceramic powder a ceramic body of good strength was obtained.

EXAMPLE 8

In this example a zircon-mullite composition of 50% calcined mullite (−325 mesh, a 70% alumina bauxite-clay calcined), 25% ground zircon (−325 mesh) and 25% South Carolina clay was used in place of the α-alumina of Example 1. The rest of the procedure was the same as Example 1 except that the sintering temperature was 1225°–1350°C. a ceramic body of good strength was obtained.

EXAMPLE 9

Example 1 was repeated except that in place of α-alumina, a spinel (commercially available from W. R. Grace & Co.) prepared from the decomposition of high purity magnesium aluminate was used. The sintering temperature was 1225°–1350°C. and a porous ceramic body of good strength was obtained.

Another preferred ceramic powder is that commonly referred to as cordierite, which is a zeolite of the formula $2MgO \cdot 2Al_2O_3 \cdot 5SiO_2$. The following cordierite compositions were prepared and used as the ceramic powder in the plastic composition.

EXAMPLES 10–13

In Example 10 a cordierite composition was prepared by admixing 50% by weight Florida kaolin and 50% by weight sierralite (a relatively pure prochlorite commercially available from United Sierra Div. Cyprus Mines Corp.). The mixture was substituted for the α-alumina of Example 1. The remaining procedure of Example 1 was followed. The resulting good strength, porous ceramic body was sintered at 1200°–1225°C. In Example 11 the procedure of Example 1 was followed except that a cordierite composition was prepared from 75% by weight Florida Kaolin and 25% by weight talc. The porous ceramic body which was obtained after sintering at 1300°C. was of good strength. In Example 12 a cordierite composition of 72.5% by weight Florida kaolin, 22% by weight talc, and 5.5% by weight magnesium carbonate was substituted for the α-alumina of Example 1. The rest of the procedure of Example 1 was followed except that sintering took place at 1275°–1300°C. and a strong porous ceramic body was obtained. In Example 13 the α-alumina of Example 1 was replaced with a cordierite composition prefaced by admixing 68% by weight Florida kaolin, 15% by weight talc, and 17% by weight magnesium carbonate. The rest of the procedure of Example 1 was followed and a strong porous ceramic body was obtained.

EXAMPLES 14–17

Example 1 was repeated except that the plasticizer, mineral oil, was replaced by the following plasticizers: glycerin (Example 14), diethylene glycol (Example 15), dipropylene glycol (Example 16), and polyacrylic acid (Example 17). In each case the plasticizer was extracted with water and the end product was a strong porous ceramic material.

EXAMPLE 18

This example is intended to show the importance of the plasticizer in the filled polyolefin. A filled plastic material was prepared from 66.7% by volume (90% by weight) α-alumina and 33.3% by volume (10% by weight) particle form linear polyethylene of O melt index. The procedure of Example 1 (except, of course, for the plasticizer extraction step) was repeated.

The resulting ceramic structure was distorted, one end was bubbly, and there was a hole through the center of the structure.

The monolith prepared by the process of this invention has a characteristic shape and pattern of channels.

The cross section of the channels is essentially rectangular, the two opposing sides being formed by two successive layers of backwebs of the ribbed sheet and the other two opposing sides being formed by the ribs, which, before winding, are perpendicular to the backweb and after winding are radial to the center of the winding. In the process of this invention, the winding and heat sealing is done on a mandrel. The winding is continued until the successive layers total at least a thickness that allows cutting of the desired size of monolith from this structure wound on the mandrel. Thus, the winding radius is substantially larger than the dimension of the finished cut piece, and the actual near circular layers and the radial ribs can at any small area of the monolith be considered linear and parallel, thus forming rectangular channels. In reality, of course, the channels are formed by two circle segments and two radii in the outer circle.

The arrangement of the "rectangular" channels is also unique for these monoliths. In the first direction, perpendicular to the radius in the winding, the channels are in an orderly fashion, one channel being lined up with another, separated by the common radial wall which are ribs in the sheet being wound.

Figure 2:
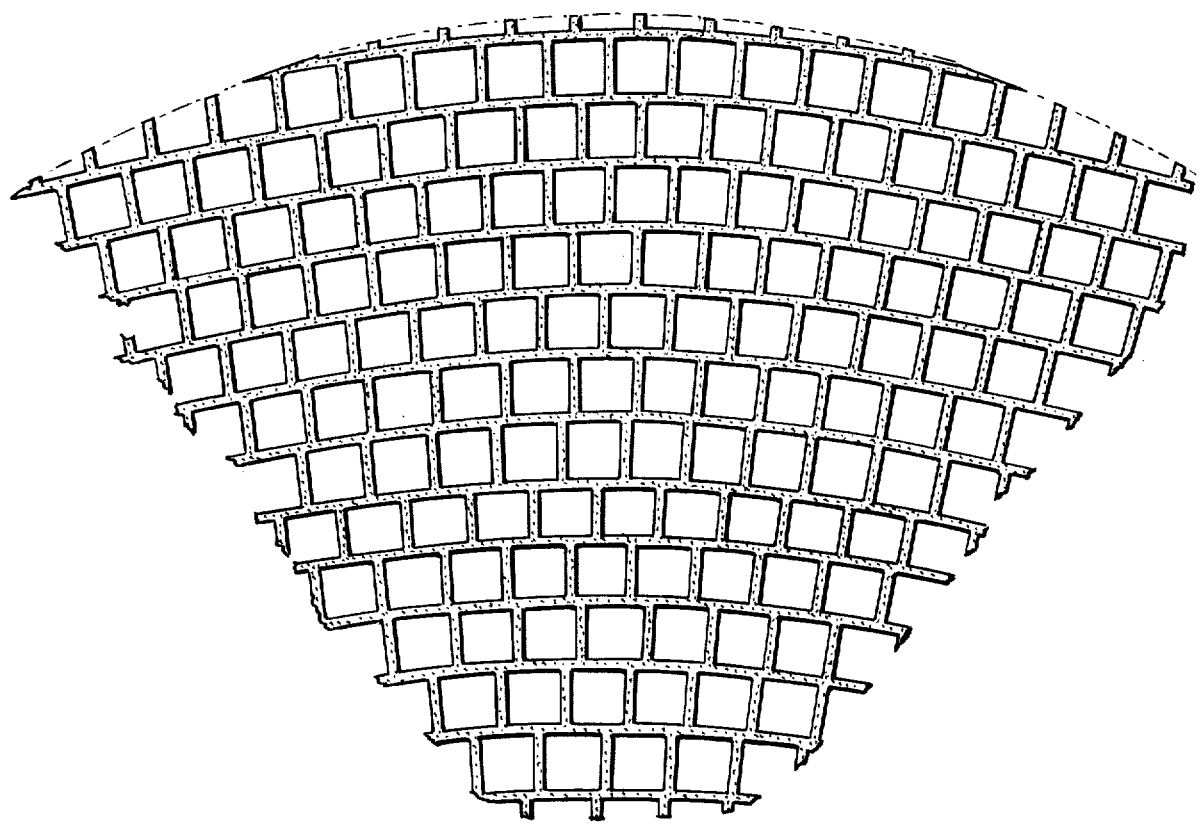
FIG. 2 is an exploded view of the structure of FIG. 1 taken from the encircled area of FIG. 1.

In the second direction, that of the radius of the winding, the channels are not all lined up, but the relative arrangement of the two adjoining channels, separated by the backweb of the sheet varies from location to location from a rib over rib structure to complete misalignment where one rib is centered between the two walls of an adjoining channel. This arrangement is advantageous in that stresses in the monolith during use are distributed more uniformly throughout the structure than if all walls were in perfect alignment. (This concept is shown particularly well in FIG. 2.)

My monolithic structure is characterized by:

a. uniform channels of an essentially rectangular cross section, laterally through the length of the monolith, varying in size from 0.025 to 0.20 inches, said channels being arranged in a pattern so that in a first direction a given channel adjoins the next channel separated by the common wall, and in a second direction, perpendicular to the first direction a given channel adjoins one or more channels sharing one wall with the adjacent other channel or channels.

b. a porosity as measured by water absorption of 20 to 30 percent, c. an average pore size of 4 to 8 microns.

What is claimed is:

1. A ceramic monolith structure prepared by a process comprising the following steps:

a. homogeneously blending a composition consisting essentially of 15–80 volume percent of a polyolefin having a molecular weight of at least 150,000 and a standard load melt index of substantially zero, 5–67 volume percent of a ceramic filler, 15–80 volume percent of a plasticizer; selected from a group consisting of mineral oils, glycols, triethyl phosphate, polyvinyl alcohol, and polyvinyl pyrrolidone, b. heating said composition to about 125° to 175°C., molding to form a plastic sheet and impressing ribs thereon, c. rolling said plastic sheet so that said ribs contact said sheet, heating to about 150°–250°C. to fuse the contacting areas together thermoplastically, d. extracting the plasticizer with water or an organic solvent, e. removing said polyolefin by heating to 240°–700°C. to form a porous ceramic structure and burn off the polyolefin and, f. firing said porous ceramic structure at a temperature of about 1300°–1450°C. for a period of time sufficient to sinter said porous ceramic structure, characterized by:

1. uniform channels of an essentially rectangular cross section laterally through the length of the monolith, varying in size from 0.025 to 0.20 inches; said channels being arranged in a pattern so that in the first direction a given channel adjoins the next channel separated by a common wall, and in a second direction, perpendicular to the first direction, a given channel adjoins one or more of the other channels sharing one wall with the adjacent other channel or channels, 2. a coefficient of thermal expansion of 1.2 to 3.0 × $10^{-6}$ per degree Fahrenheit, 3. a porosity of 20–30 percent, 4. A density of about 0.2 to 0.8 grams per cubic centimeter, 5. an average pore size of 4 to 8 microns.

2. The monolithic structure according to claim 1 wherein the ceramic filler is selected from the group consisting of alumina, corderite, mullite and silica.

3. The ceramic structure according to claim 1 wherein the plasticizer is mineral oil.

* * * * *